Jan. 14, 1969  W. L. HOCHNER  3,421,967
DECORATED THERMOSETTING PLASTIC ARTICLE AND
METHOD OF PRODUCING SAME
Filed March 3, 1965
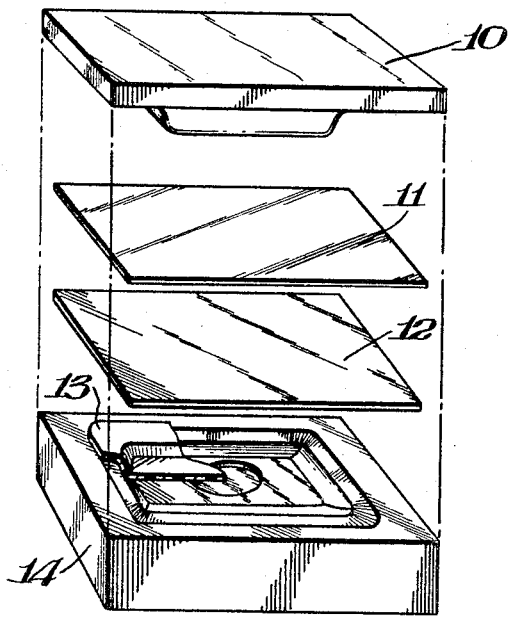
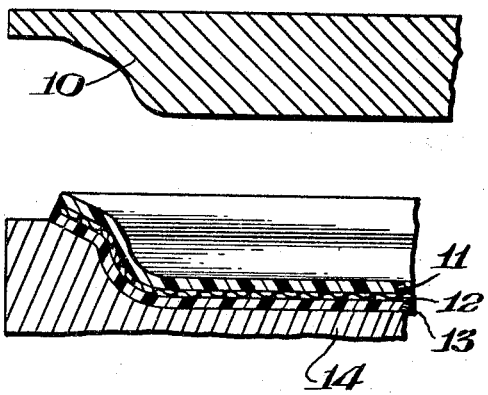
INVENTOR
WALTER L. HOCHNER
BY Connolly and Hutz
ATTORNEYS United States Patent Office 3,421,967
Patented Jan. 14, 1969

3,421,967
DECORATED THERMOSETTING PLASTIC ARTICLE AND METHOD OF PRODUCING SAME
Walter L. Hochner, Wilmington, Del., assignor to Kaumagraph Company, Wilmington, Del., a corporation of Delaware
Filed Mar. 3, 1965, Ser. No. 436,832
U.S. Cl. 161—5          13 Claims
Int. Cl. B44f 1/06; B31f 1/36

ABSTRACT OF THE DISCLOSURE

A process for producing decorated thermosetting plastic articles comprising contacting a thermosetting resin impregnated design layer, a resin-free absorbent paper and thermosetting resin material, said absorbent paper being interposed between the decorated side of said design layer and the resin material and applying heat and pressure; the decorated article so produced and a composite decorative overlay comprising a decorated thermosetting resin containing paper attached on the decorated side to a resin free absorbent paper.

This invention relates to decorated articles, an improved method of producing such articles and an improved composite decorative overlay. More particularly it relates to decorated plastic articles such as dinnerware, table tops, etc., and a method and decorative overlay for producing same which avoids the formation of blisters while providing good uniform attachment of the decoration to the plastic surface during its process of manufacture without design distortion.

The use of plastic materials has become increasingly important in recent years in several fields. In some instances, the plastics have replaced ceramic items. For example, substantial competition is now being offered by manufacturers of plastic products to those companies manufacturing the standard, old-type chinaware. A long recognized difficulty in the plastic article field has involved the inability to apply a good decorative design and adhere it tightly to the plastic. Several attempts have been made to find a satisfactory process for affixing designs to the plastic articles.

A particular problem which has faced the art is the tendency for the formation of "blisters" during the molding or laminating process. By "blisters" is meant the tendency for the design portions of the decorative overlay to form no adherence to plastic although the remainder of the foil is tightly adhering. This problem often occurs when a relatively heavy concentration of printing ink is attempted to be bonded against the plastic surface. The problem also occurs when the ink design, although in light concentrations, forms a continuous coherent film layer on the decorative overlay. The reason for the formation of these blisters is not definitely known but various theories have evolved. It is believed that a skin or gas impenetrable surface is formed on the surface of the decorated foil as soon as the foil is subject to heat or pressure. The decorated foils cure very quickly in the mold for example in about 10 seconds. Plastics used in the formation of these articles are condensing materials and during the curing process liberate gases. These gases must somehow escape through the decorated foil or else be entrapped between the foil and the plastic material causing the so-called blisters. Such gases forming between the printing ink on the decorated foil surface and the surface of the plastic material have nowhere to go since the skin or gas impenetrable surface on the decorated foil has already been formed. Adherence has also been formed between the undecorated surface of the foil and the plastic surface and, therefore, the gases are entrapped between the ink and the plastic surface causing a blister. The formation of such blisters prevents a uniform attachment of the decoration to the plastic article and can also cause deformation of the decoration.

Various means have been used to reduce the tendency for the formation of these blisters. One such method is to dust a fine resin powder over the litho or offset decoration which through experience is suspect of blistering. The purpose of this resin is to act as an adhesive and cause bonding between the plastic surface and the decoration. A related method is to apply the resin powder in liquid form, and actually coat the inked areas after the decorative foil has been produced. These methods while somewhat effective to reduce blistering do not give good adherence between the design and the plastic article. The amount of resin which is dusted or coated is limited by, for example, the curling tendencies of the foil.

Another, but more costly method, is to place a piece of unprinted, resin impregnated foil between the conventional foil and the plastic surface. The purpose of the impregnated foil is to supply extra resin for bonding the decoration to the surface. The use of such an impregnated paper underneath a conventional decorated overlay foil has certain advantages but also a number of disadvantages. If the article to be molded has a small degree of curvature, as is often the case in dinnerware, the flat impregnated paper must conform to the curved shape and in many cases stretch to the new shape. The extra resin in the impregnated sheet flows during molding particularly in areas where it must stretch due to small curvatures. This causes the ink design in the decorated foil to "breakup" and, in fact, the ink design can be washed away from areas where a high degree of flow is found. This is a distinct disadvantage causing distortion of the design and/or areas of no color at all and, therefore, the method is not widely used.

It is an object of this invention to provide improved molded or laminated plastic articles and improved methods of producing such plastic articles which prevents the formation of blisters. Another object is to provide an excellent and uniform bond between the decorated foil and the plastic surface. Additional objects of the invention include the prevention of blister formation without the concomitant distortion of the design. An additional object is a composite decorative foil which can be used in various molding and laminating procedures which avoids the formation of blisters while providing outstanding uniform attachment. Other objects of the invention will become apparent as the description proceeds.

The novel features and advantages of the present invention will become apparent to one skilled in the art from a reading of the following description in conjunction with the accompanying drawings wherein similar reference numerals refer to similar parts and in which:

FIG. 1 is an exploded view showing the manner in which the decorated article is produced according to one embodiment of the invention and FIG. 2 is a fragmentary diagrammatic sectional elevation of the partially cured article in the mold.

FIG. 3 is a cross sectional view of a decorative foil according to the invention.

According to the invention it has been found that the formation of blisters can be avoided while attaining a tight and uniform bond between the decoration and surface of the plastic if prior to laminating or molding an unimpregnated absorbent paper is placed as an interlay between the design portion of the decorated foil and the plastic surface. By unimpregnated paper is of course meant that the paper is neither impregnated nor coated with a resin material and in that sense is resin free. It is believed that the absorbent paper acts in part as a channelling media to allow the gas formed during curing to escape thereby preventing blister formation. Furthermore, the absorbent paper unexpectedly absorbs sufficient resin during the laminating or molding operation and provides a tight and uniform bond between the design area and the plastic surface. Unlike the situation prevalent when impregnated foils are used as an interlay the present invention does not result in distortion or break up of the design due to resin flow even in areas of very small curvature.

FIG. 1 represents an exploded view of how the process according to the invention may be carried out in the production of, for example, a decorated dinnerplate. In FIG. 1 mold halves 10 and 14 are shown in open position. A partially cured preform 13, of for example, melamine-formaldehyde resin is shown in mold half 14. Over the preform is first placed a sheet of absorbent, unimpregnated paper 12 (e.g., α-cellulose). Decorated foil 11 is then placed over 12, design side down. The mold halves are then closed and heat and pressure are applied to complete the mold cycle.

FIG. 2 represents a fragmentary diagrammatic sectional elevation of the partially cured article and shows absorbent, unimpregnated paper 12 between decorated foil 11 and resin preform 13 prior to the final molding step.

FIG. 3 represents a cross-sectional view of a composite decorative foil according to one embodiment of the invention. In this embodiment, unimpregnated, absorbent paper 12 is physically attached to decorated foil 11 making it unnecessary to use the two step operation of first inserting paper 12 and then foil 11 into the mold.

In the embodiment described in FIGS. 1 and 2, an essentially two step molding cycle is utilized. This general process is illustrated in United States Patents Nos. 2,646,380, 2,760,899, 2,797,180 and 2,833,685. In the first step, a charge of, e.g., melamine-formaldehyde molding powder is placed in the lower half of a mold corresponding in size and shape to that of the article to be formed, and the upper half of the mold is then lowered sufficiently to close the mold. Sufficient heat and pressure are applied to powder in this manner to form a partially cured "preform" in about 30 seconds. For the second step, the mold is opened and first the unimpregnated absorbent paper and then decorated foil is laid over the preform in the mold. This decorated foil is usually a flat sheet of thin, fibrous material such as paper which is impregnated with a partially cured resin of the same general although not necessarily identical type as that in the preform, e.g., melamine-formaldehyde, and bears the necessary design. The mold is now closed again and sufficient pressure and heat applied to complete molding. At the completion of this second step of molding, the mold is opened and the finished product removed. The foil is generally applied with the ornamented face down, and reliance is placed upon the circumstance that the foil becomes almost wholly transparent, hence invisible, during the curing and integration procedure, so that the design is clearly visible through the foil.

The present invention is also applicable to one step molding operations such as are described in United States Patent Nos. 3,057,018 and 3,117,053. In the one step method a decorated resin-impregnated foil is placed in a mold. The unimpregnated absorbent paper is placed on top of the foil and covered with a quantity of thermosetting molding powder such as melamine-formaldehyde, or urea-formaldehyde, and the mold is then closed. Subsequent compression of the resin with the application of heat cures the resin and embeds the decorated foil in, and bonds it to, the molded article. The advantages of one-step molding is that it eliminates the conventional first step of forming a shaped preform of the resin in the mold before the printed foil is applied thereto. Alternatively the molding powder may be placed first in the mold, the absorbent, unimpregnated paper thereover and the decorated foil on top of the paper. In either case, the decorated foil is placed with the printed or decorated side contacting the absorbent, unimpregnated paper and the paper is located between the decorated foil and the resin powder.

The present invention can also be used in the formation of decorated laminates. In this process a series of resin impregnated paper stocks are sandwiched together. The unimpregnated absorbent paper is placed on top thereof, the decorated foil is placed thereover, a clear sheet is placed on top of the decorated foil and the entire sandwich is pressed together with the application of heat.

Needless to say, in any of the above molding or laminating procedures the composite decorative overlay of FIG. 3 may be used. When used it is placed in the mold in such a manner that the unimpregnated absorbent paper contacts the plastic preform, molding powder or paper stock.

Numerous variations of the above described processes are well known in the art as illustrated by the above-cited patents and further detailed description is believed unnecessary.

While the invention has applicability to any of the above described processes, it is particularly useful in the two stage molding process wherein a preform is produced in the first step, the absorbent, unimpregnated paper and then the decorated foil is placed thereover and the molding cycle completed. In such an operation the problem of blistering is particularly noticeable. This is because, unlike in the laminating or one step molding procedures, the second step involves the bonding of a partially cured preform with the partially cured resin in the decorative overlay. It is more difficult to effect a good adherent bond between two surfaces of partially cured resin than it is when uncured and therefore more reactive surfaces are involved. Furthermore, the partially cured preform has a hard surface which cannot be permeated by the gas evolved in curing, unlike the somewhat porous surface initially present in, for example, the one step molding process.

The unimpregnated, absorbent paper useful according to the invention includes a variety of absorbent papers such as alpha cellulose, rice paper, hemp paper, papers made from rayon, cotton, linen or similar vegetable origin papers, nylon, polyesters ("Dacron"), polyacrylonitrile ("Orlon") and blends or mixtures thereof. Generally any of the papers commonly used to make the decorated foil can be used. Preferably there is used either an α-cellulose or an α-cellulose-rayon blend paper.

During the molding or laminating procedure the absorbent nature of the paper is such that the resin is absorbed through the entire thickness of the paper. Any absorbent paper is useful provided it does not yellow on age or otherwise render the design unacceptable. The paper must be absorbent and resin free. It may be itself colored either entirely or with a matching and/or contrasting design to form a unitary effect with the decorative foil overlay provided naturally that the design or color in the paper does not adversely effect its absorbent properties. The paper may generally be of any thickness provided that during the molding or laminating operation the resin is absorbed entirely through the paper. If this were not so, a bond between the decorated foil and the resin would not form. The paper may, for example, vary in thickness between about 1 to 50 mils with a preferred range being between about 4 and 6 mils.

The absorbent paper should generally be the same size as the decorative foil. By this means maximum blister prevention is obtained. Furthermore, if the absorbent paper were not the same size, differences in pressure would result during molding and the article produced would not be commercially acceptable.

Various decorated foils can be used according to this invention and per se are well known in the art. They are generally formed from resin impregnated papers (such as the papers described above) where the resin is totally impregnated or coated on both or only one side. Generally the paper contains from 60 to 75 weight percent resin with a preferred amount of about 66 percent. The papers should generally be such that they become transparent or at least translucent during the molding cycle since the design must show through. Additional undecorated impregnated sheets may be utilized on the outside of the decorated foil or resin powder may be applied thereon to provide a resin rich surface with concomitant stain and scratch resistance. The resin utilized in the decorated foil should be the same as or similar to the resin in the remainder of the article such that a bond can form between the resin in the foil and in the remainder of the article.

The resin impregnated foil is decorated by various means. The inks used are well known for this purpose and should be fast to heat and formalin vapors (e.g., pigment scarlet, phthalocyamine blue and green, carbon black, benzidine yellow, etc.). The inks may be water or oil based. The oil base inks are most commonly used and show the greatest tendency to blister. This is because they generally contain film forming agents. Water base inks, however, also cause a blister problem particularly in heavy inked areas and/or where film forming agents are used. The exact concentration or extent of the ink in a given area which will cause blistering is variable depending on the conditions (pressure, time, temperature, etc.) of the molding or laminating process. Any time the ink is laid down in such a manner as to form a substantially continuous coherent coating the problem will result. Some printing processes such as silk screening will almost always cause a blister problem while other processes such as lithograph may cause the problem only in selected portions of the design wherein the tonal dot density is high.

Needless to say, even in those designs or areas of the design where the blister tendency is low the use of the absorbent paper provides outstanding uniform adherence between the decorated foil and the remainder of the article. This adherence is better than that obtained where no interlay is used or where mere dusting or coating of the foil prior to molding has been accomplished. The adherence is comparable or better than that obtained with an impregnated interlay and the concomitant expense and decoration distortion are avoided.

In the preceding discussion, no attempt has been made to limit to a synthetic resin of a particular type the resin from which the finished product is made. This is for the reason that the invention may be carried out successfully with synthetic resins of widely different types. The invention is to be employed with thermosetting resins, which are hard, scratch-resistant and resistant to hot water, organic solvents, household stains, etc. Of the thermosetting resins, the aminoplasts are best for the purposes of the present invention, particularly cellulose-filled melamine-formaldehyde of various kinds that are commercially available at the present time in the form of powder or granules.

In a typical case, the synthetic resin used will be a commercial melamine-formaldehyde molding powder containing 35% of alpha cellulose as a filler; e.g., American Cyanamid Company's "Cymel 1077" or Allied Chemical Company's "Plaskon TWX–22." Suitable unfilled melamine-formaldehyde molding powder may be employed, for example, American Cyanamid Company's "Cymel 404." If desired, it is possible to use in the mold charge a filled urea-formaldehyde molding powder such as American Cyanamid Company's "Beetle" series resin. Other resins of the melamine-formaldehyde type include the Cymel resins (e.g., "Cymel 1079," "Cymel 1500" or "Cymel 3020") sold by American Cyanamid Corporation.

The above resins are merely illustrative of the various resin materials known in the art for molding and laminating purposes. In general any resin of the thermosetting aldehyde-aminotriazine, urea-aldehyde, thiourea-aldehyde, phenol-aldehyde, type may be used.

The absorbent unimpregnated paper according to the invention is placed between the inked surface of the decorated foil and the plastic surface to which it is to be bonded. The inked surface is normally printed on the decorated foil after the foil paper has been impregnated or coated. It is possible, however, to use a decorated foil which has been resin coated after being decorated. Normally the foil is placed with the decorated side against the preform, impregnated paper stock or molding paper since this gives added protection to the design. In such cases the absorbent paper of the present invention is used as an interlay between the decorated surface and the remainder of the article. In some cases it is known to use a decorated foil wherein the decorated side does not contact the preform, molding resin, etc. In such cases a clear impregnated foil is laid in contact with the design or molding powder is dusted on top of the design. When this process is used the absorbent paper is placed between the design side and the dusted molding powder or impregnated sheet. This latter method is not preferred since the decoration is provided with limited protection and can quickly be destroyed in use.

A composite decorated foil particularly useful according to the invention comprises a decorated impregnated foil, such as those described above, having the unimpregnated, absorbent paper of the invention attached on the printed side. This composite foil makes it unnecessary to use the two steps of positioning first the absorbent paper and then the decorated design on the mold. The composite foil, cut to size is used as the previously used foils.

Numerous means can be employed to attach the absorbent paper to the decorated foil such as by brief heat and pressure application to melt a small portion of the resin in the decorated overlay and adhere the paper, melamine cement, ultra-sonics, pin holes, or even mere wetting of the two elements. For practical reasons it is preferred that the points of attachment be around the edges of the decorated foil and absorbent paper.

The following examples are presented to further illustrate the invention and do not constitute express or implied limitations.

EXAMPLE 1

A female mold for making dinnerplates (10 inch) was filled with 310 grams of molding powder (melamine-formaldehyde-"Cymel 1077"). A preform was produced by applying 3,100 p.s.i. and a temperature of 320° F. to the closed mold. The mold was opened and an unimpregnated (resin-free) absorbent paper ($\alpha$-cellulose—5 mil thickness) was placed over the preform. Over this was placed a decorated foil, the decorated side against the $\alpha$-cellulose paper. The foil comprised resin impregnated (melamine-formaldehyde) mixed $\alpha$-cellulose/rayon paper ("Hurlbut Rayon 900") which had been decorated with a figured design having a dark colored background (oil base ink). The mold was closed for 40 seconds at the same temperature and pressure as the first step. The plate produced showed no blistering despite heavy concentrations of ink. The bond produced was excellent and uniform. No distortion or lightening of the dark background was noted even in areas of sharp curvature.

As a comparison the same steps and conditions as above were followed except that no $\alpha$-cellulose paper was interlaid between the decorated foil and the preform. The plate produced showed extensive blistering. The blistering was so wide spread that the decorated foil actually showed no adhesion in the areas of high ink concentration. The foil lifted from the preform and due to the brittle nature of the cured foil cracked extensively. Only in the lightly inked areas did any bond form and this bond was exceptionally weak as shown by subsequent mechanical testing.

EXAMPLE 2

The same resin as used in Example 1 was placed in a female mold for dinnerplates. A preform was produced by closing the mold for 30 seconds at 3,000 p.s.i. and temperature of about 310° F. The mold was opened and an unimpregnated, absorbent 50 percent cotton, 25 percent hemp and 25 percent linen paper was placed over the so-formed preform. An already decorated α-cellulose rayon mixed paper ("Hurlbut Rayon 900"), melamineformaldehyde imprgenated was placed over the paper, decoration side down. The decoration comprised a flower figure of water base printing ink. The mold was closed for about 45 seconds at the same temperature and pressure. The plate so produced showed an excellent bond between the design layer and the preform surface. No signs of blistering were noted desipite the relatively heavy concentration of ink on the decorated foil.

EXAMPLE 3

In a manner similar to Example 1 a preform was produced of melamine-formaldehyde resin. Over the preform was placed a composite decorated foil comprising an absorbent α-cellulose-rayon blend paper attached to the decorated foil as used in Example 1. The attachment was by light application of melamine cement at selected portions around the edges of the foil. The absorbent side of the composite foil contacted the preform. The molding cycle was completed producing a plate of excellent properties both as to blistering and uniform adhesion.

EXAMPLE 4

A female mold for producing bottle closures was filled with phenol-formaldehyde (15 grams) and a preform produced by closing the mold and applying heat and pressure (300° F. and 3,100 p.s.i.). The mold was opened and an α-cellulose rayon blended, resin-free paper was placed over the preform. A decorated phenol-formaldehyde impregnated foil was placed decorated side down over the α-cellulose paper (the decorating comprised a light background with suitable lettering formed with oil base ink). The mold was closed for 45 seconds at the same temperature and pressure to produce a bottle closure having no design distortion or blistering and showing a uniform bond between the decoration and the foil.

EXAMPLE 5

A female mold is filled with urea-formaldehyde molding resin. The mold was closed for 30 seconds at 3,200 p.s.i. and 300° F. to produce a preform. Over the preform was placed a composite decorated foil comprising a resin-free linen paper attached to a decorated foil, the decoration side being against the linen paper. The decorated foil was a resin coated (melamine-formaldehyde) linen paper. The coating was one side only of the linen paper with the decoration on the uncoated side. The mold was closed and maintained at 3,200 p.s.i. and 300° F. for about 45 seconds. The finished article (a light switch wall plate) showed no tendency to blister and the design was not distorted.

EXAMPLE 6

A series of paper sheets are impregnated with phenol-formaldehyde resin and dried. The so dried sheets are stacked in a press. On top of the stack is placed a sheet of α-cellulose paper. On top of this is placed a decorated foil comprising a decorated, melamine-formaldehyde coated rayon paper (printing after coating). The decoration side of the foil was placed against the α-cellulose paper. The entire stack is pressed at about 1,200 p.s.i. for 30 minutes at 280° F. The decorated laminate so produced showed no blister tendency and the decorated foil was firmly bonded to the laminate.

EXAMPLE 7

In a female mold was placed a decorated foil as described in Example 2, decorated side up. On top of this was placed a sheet of absorbent, unimpregnated nylon paper. A change of melamine-formaldehyde resin was placed in the mold, the mold closed and the mold cycle completed. The resultant article showed no blistering or distortion tendencies.

EXAMPLE 8

A bottle closure was molded by first placing melamine-formaldehyde molding powder ("Cymel 1079") in a female mold and smoothing this out to a flat surface. 17 grasm of molding powder were used, free from particles over 20 mesh. Over the powder was placed a sheet of α-cellulose paper which has not been impregnated by resin (i.e., resin free). A sheet of decorated impregnated paper (melamine-formaldehyde impregnated rayon paper) was placed over the unimpregnated paper with the decorated side down. The mold was closed at a pressure of 100 tons with a temperature of 320° F. The mold was degassed after 20 seconds and molding continued for 45 seconds. A good molded closure was obtained showing no blisters or distortions in the design.

What we claim is:
1. In the process for the production of decorated, molded thermosetting plastic articles wherein thermosetting resin molding powder is placed in a mold, a preform of said resin molding powder is formed, the design portion of a decorated, thermosetting resin impregnated foil is placed in contact with the preform, the mold is closed and heat and pressure are applied to bond the decorated foil to the preform, the improvement comprising avoiding the formation of blisters by interposing between the design portion of the decorated foil and the preform a resin free, absorbent paper, closing the mold and applying heat and pressure to bond the decorated foil to the preform.

2. The method of claim 1 wherein the resin free, absorbent paper is a paper selected from the group consisting of alpha cellulose, rice, hemp, rayon, cotton, linen, nylon, polyester, polyacrylonitrile and mixtures thereof.

3. The method of claim 1 wherein the resin material is a resin selected from the group consisting of melamine-aldehyde, urea-aldehyde and phenol-aldehyde.

4. The method of claim 3 wherein the resin material is melamine-formaldehyde.

5. In the process for the production of decorated, molded melamine-formaldehyde plastic articles wherein melamine-formaldehyde molding powder is placed in a mold, a preform of said melamine-formaldehyde molding powder is formed, the design portion of a decorated, thermosetting resin impregnated foil is placed in contact with the preform, the mold is closed and heat and pressure are applied to bond the decorated foil to the preform, the improvement comprising avoiding the formation of blisters by interposing between the design portion of the decorated foil and the melamine-formaldehyde preform a resin free, absorbent α-cellulose containing paper, closing the mold and applying heat and pressure to bond the decorated foil to the preform.

6. In the process for the production of decorated, molded thermosetting plastic articles wherein thermosetting resin molding powder is placed in a mold and heated and compressed therein against the design portion of a decorated, thermosetting resin impregnated foil to bond the foil to one side of the resultant article, the improvement comprising avoiding the formation of blisters by interposing between the thermosetting resin molding powder and the design portion of the decorated foil prior to bonding a resin free, absorbent paper and bonding the decorated foil to one side of the resultant article.

7. The method of claim 6 wherein the resin free, absorbent paper is a paper selected from the group consisting of alpha cellulose, rice, hemp, rayon, cotton, linen, nylon, polyester, polyacrylonitrile and mixtures thereof and the resin material is a resin material selected from the group consisting of melamine-aldehyde, urea-aldehyde and phenol-aldehyde.

8. A composite decorative overlay for the production of molded decorated thermosetting plastic articles from molding powder without the formation of blisters consisting essentially of a thermosetting resin containing paper, one side of which carries a design and a resin free, absorbent paper attached to said resin containing paper and covering the design side of said resin containing paper.

9. The composite decorative overlay of claim 8 wherein the resin-free, absorbent paper is a paper selected from the group consisting of alpha cellulose, rice, hemp, rayon, cotton, linen, nylon, polyester, polyacrylonitrile and mixtures thereof and the thermosetting resin is a resin selected from the group consisting of urea-aldehyde, melamine-aldehyde and phenol-aldehyde.

10. The composite decorative overlay of claim 8 wherein the resin-free, absorbent paper is an alpha cellulose containing paper and the thermosetting resin is melamine-formaldehyde.

11. A composite decorative overlay for the production of molded decorated thermosetting plastic articles from molding powder without the formation of blisters consisting essentially of a melamine-formaldehyde impregnated α-cellulose containing paper, one side of which carries a design and a resin-free, absorbent α-cellulose containing paper attached to said melamine-formaldehyde impregnated paper and covering the design side of said melamine-formaldehyde impregnated paper.

12. The decorated thermosetting plastic article produced by the method of claim 1.

13. The decorated thermosetting plastic article produced by the method of claim 5.

References Cited
UNITED STATES PATENTS

| | | | |
|---|---|---|---|
| 2,276,567 | 3/1942 | Donaldson | 156—224 |
| 2,760,899 | 10/1956 | Cameron et al. | 156—224 |
| 2,801,198 | 7/1957 | Morris et al. | 161—258 X |
| 3,074,840 | 1/1963 | Teplansky et al. | 156—224 |

ROBERT F. BURNETT, *Primary Examiner.*

R. L. MAY, *Assistant Examiner.*

U.S. Cl. X.R.

161—6, 263, 413; 156—224, 245; 264—132, 136